United States Patent
Klein et al.

(10) Patent No.: US 12,448,473 B2
(45) Date of Patent: *Oct. 21, 2025

(54) METHOD FOR THE PREPARATION OF PHOTOALIGNING POLYMER MATERIALS AND COMPOSITIONS

(71) Applicant: ROLIC TECHNOLOGIES AG, Allschwil (CH)

(72) Inventors: Cedric Klein, Herrlisheim-près-Colmar (FR); Fabien Xavier Delbaere, Flaxlanden (FR); Richard Frantz, Village-Neuf (FR)

(73) Assignee: ROLIC TECHNOLOGIES AG, Allschwil (CH)

( * ) Notice: Subject to any disclaimer, the term of this patent is extended or adjusted under 35 U.S.C. 154(b) by 1383 days.

This patent is subject to a terminal disclaimer.

(21) Appl. No.: 16/628,183

(22) PCT Filed: Aug. 8, 2018

(86) PCT No.: PCT/EP2018/071532
§ 371 (c)(1),
(2) Date: Jan. 2, 2020

(87) PCT Pub. No.: WO2019/030294
PCT Pub. Date: Feb. 14, 2019

(65) Prior Publication Data
US 2020/0148802 A1    May 14, 2020

(30) Foreign Application Priority Data

Aug. 9, 2017  (EP) .................................... 17185480

(51) Int. Cl.
| | | |
|---|---|---|
| *C08F 220/30* | (2006.01) | |
| *C08F 20/30* | (2006.01) | |
| *C08F 22/26* | (2006.01) | |
| *C08F 120/30* | (2006.01) | |
| *C08F 220/22* | (2006.01) | |
| *C08F 222/26* | (2006.01) | |
| *G02F 1/1337* | (2006.01) | |
| *C08F 20/22* | (2006.01) | |
| *C08F 22/20* | (2006.01) | |
| *C08F 120/22* | (2006.01) | |
| *C08F 122/20* | (2006.01) | |
| *C08F 122/26* | (2006.01) | |
| *C08F 222/18* | (2006.01) | |
| *C08F 222/20* | (2006.01) | |

(52) U.S. Cl.
CPC .......... *C08F 220/303* (2020.02); *C08F 20/30* (2013.01); *C08F 22/26* (2013.01); *C08F 220/22* (2013.01); *C08F 222/26* (2013.01); *G02F 1/133711* (2013.01); *G02F 1/133788* (2013.01); *C08F 20/22* (2013.01); *C08F 22/20* (2013.01); *C08F 120/22* (2013.01); *C08F 120/30* (2013.01); *C08F 122/20* (2013.01); *C08F 122/26* (2013.01); *C08F 220/30* (2013.01); *C08F 220/302* (2020.02); *C08F 222/18* (2013.01); *C08F 222/185* (2020.02); *C08F 222/20* (2013.01); *C08F 222/205* (2020.02)

(58) Field of Classification Search
CPC ................ C08F 220/30; C08F 220/302; C08F 220/303; C08F 220/22; C08F 120/30; C08F 2220/30; C08F 2220/22; C08F 22/20; C08F 22/18; C08F 22/26; C08F 122/20; C08F 122/18; C08F 122/26; C08F 222/20; C08F 222/205; C08F 222/18; C08F 222/185; C08F 222/26; G02F 1/133711; G02F 1/133788
See application file for complete search history.

(56) References Cited

U.S. PATENT DOCUMENTS

| | | |
|---|---|---|
| 6,107,427 A | 8/2000 | Herr et al. |
| 10,423,033 B2 | 9/2019 | Kodera et al. |
| 11,874,563 B2 * | 1/2024 | Klein ..................... C08F 220/34 |
| 2003/0232930 A1 | 12/2003 | Gibbons et al. |
| 2013/0281564 A1 * | 10/2013 | Seiberle ................ C08F 220/30 |
| | | 252/182.18 |
| 2013/0331482 A1 | 12/2013 | Tanabe et al. |
| 2016/0274418 A1 | 9/2016 | Schadt et al. |

FOREIGN PATENT DOCUMENTS

| | | |
|---|---|---|
| CN | 105492965 A | 4/2016 |
| CN | 105593755 A | 5/2016 |
| EP | 16182085.7 | 7/2016 |
| JP | 2002-30030 A | 1/2002 |
| JP | 2016-079189 A | 5/2016 |
| WO | 03/102045 A1 | 12/2003 |
| WO | 2012/085048 A1 | 6/2012 |
| WO | 2015/024810 A1 | 2/2015 |

OTHER PUBLICATIONS

International Search Report for PCT/EP2018/071532 dated Oct. 11, 2018 [PCT/ISA/210].
Written Opinion for PCT/EP2018/071532 dated Oct. 11, 2018 [PCT/ISA/237].

* cited by examiner

*Primary Examiner* — Randy P Gulakowski
*Assistant Examiner* — David L Miller
(74) *Attorney, Agent, or Firm* — Sughrue Mion, PLLC

(57) ABSTRACT

The present invention relates to a novel method for the preparation of photoaligning polymer materials comprising aryl acrylic acid ester groups, to photoalignment compositions obtained by this process, to the use of the composition as orienting layer for liquid crystals and to non-structured and structured optical elements, electro-optical elements, multi-layer systems or in nanoelectronics comprising the compositions.

16 Claims, No Drawings

METHOD FOR THE PREPARATION OF PHOTOALIGNING POLYMER MATERIALS AND COMPOSITIONS

The present invention relates to a process for synthesizing a photoaligning homopolymer material comprising aryl acrylic acid ester groups, to photoalignment compositions obtained by this process, to the use of said compositions as orienting layer for liquid crystals for the production of non-structured and structured optical elements, nanoelectronic elements or electro-optical elements and multi-layer systems and to non-structured and structured optical elements, nanoelectronic elements or electro-optical elements, multi-layer system and variable transmission films comprising said compositions.

U.S. Pat. No. 6,107,427 describes photoaligning polymer materials and compositions comprising aryl acrylic acids esters and amides and their synthesis. However, this synthesis process requires the use of very expensive educts and requires the use of toxic materials and additives. In addition the synthesis processes are tedious, the yield is moderate and the final product is very difficult to isolate.

To overcome the drawbacks of the prior art, the inventors of the present invention have found a new process for the synthesis of a aryl acrylic acid esters photoaligning polymer material comprising repeating structural units of formula (I):

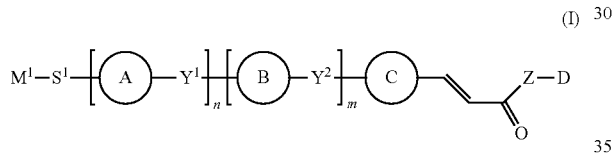

(I)

wherein
- $M^1$ signifies a repeating monomer unit from the group consisting of acrylate, methacrylate, 2-chloroacrylate, 2-phenylacrylate, acrylamide, methacrylamide, 2-chloroacrylamide, 2-phenyl-acrylamide, N-lower alkyl substituted acrylamide, N-lower alkyl substituted methacrylamide, N-lower alkyl substituted 2-chloroacrylamide, N-lower alkyl substituted 2-phenylacrylamide, vinyl ether, vinyl ester, styrene, diamine, amide, imide, siloxane, amic ester, and amic acid;
- $S^1$ is a spacer unit; and
- ring A signifies phenylene which is unsubstituted or optionally substituted with fluorine, chlorine, cyano, alkyl or alkoxy, pyridine-2,5-diyl, pyrimidine-2,5-diyl, 1,3-dioxane-2,5-diyl, cyclohexane-1,4-diyl, piperidine-1,4-diyl or piperazine-1,4-diyl;
- ring B signifies phenylene which is unsubstituted or optionally substituted with fluorine, chlorine, cyano, alkyl or alkoxy, pyridine-2,5-diyl, pyrimidine-2,5-diyl, 1,4- or 2,6-naphthylene, 1,3-dioxane-2,5-diyl or cyclohexane-1,4-diyl;
- ring C is phenylene which is unsubstituted or optionally substituted with fluorine, chlorine, cyano, alkyl or alkoxy, pyrimidine-2,5-diyl, pyridine-2,5-diyl, 2,5-thiophenylene, 2,5-furanylene, 1,4- or 2,6-naphthylene,
- $Y^1$, $Y^2$ each independently signify a single covalent bond, $-(CH_2)_t-$, $-O-$, $-CO-$, $-CO-O-$, $-O-OC-$, $-CF_2O-$, $-OCF_2-$, $-NR^4-$, $-CO-NR^4-$, $-R^4N-CO-$, $-(CH_2)_u-O-$, $-O-(CH_2)_u-$, $-(CH_2)_u-NR^4-$ or $-NR^4-(CH_2)_u-$, in which
- $R^4$ signifies hydrogen or lower alkyl;
- t signifies a whole number of 1 to 4;
- u signifies a whole number of 1 to 3;
- m, n signifies a whole number of 0 to 4;
- Z signifies $-O-$ or $-NR^5-$, in which $R^5$ signifies hydrogen or lower alkyl, or a second group of formula D; and
- D is hydrogen or a straight-chain or branched alkylene group with 1 to 20 carbon atoms which is optionally at least once substituted with halogen or with at least one siloxane moieties, or a cycloalkyl residue with 3 to 8 ring atoms which is optionally substituted with at least one halogen, alkyl or alkoxy.

The process for the preparation of said aryl acrylic acid esters photoaligning polymer material comprises the following steps:

a. reacting a compound of formula (II)

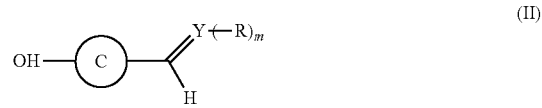

(II)

wherein
Y is either CR' or O; and
if Y is CR' then m=1 and R=COOR"
wherein R' and R" are independently from each other hydrogen or a straight-chain or branched alkylene group with 1 to 20 carbon atoms which is optionally at least once substituted with halogen or with at least one siloxane moieties, or a cycloalkyl residue with 3 to 8 ring atoms which is optionally substituted with at least one halogen, alkyl or alkoxy; or
if Y is O, then m=0; and
ring C is as defined above;
with a compound of formula (III)

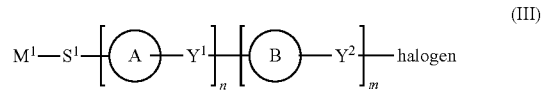

(III)

wherein $M^1$, $S^1$, ring A, $Y^1$, ring B and $Y^2$, n and m are as defined above;
and optionally with a compound of formula (IV) or (IV')

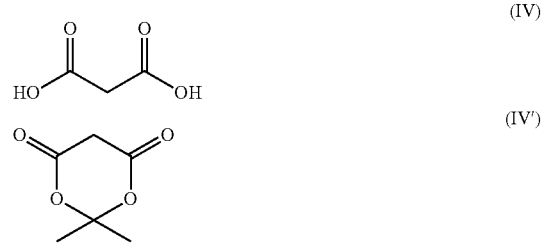

(IV)

(IV')

b. optionally reacting the compound obtained under step a. with a compound of formula (V)

$$X-(CZ_qZ'_{q'})_p-CZ_rZ'_{r'}$$ (V)

wherein X is OH, F, Cl or I;

Z and Z' are independently from each other either H or halogen;

q and q' are independently from each other an integer between 0 and 2;

p is an integer between 0 and 10 r and r' are independently from each other an integer between 0 and 3;

c. polymerizing the compound obtained under step a. or b. with an organic or inorganic peroxide;

d. stopping the reaction by heating or with a radical inhibitor or a radical scavenger.

The reaction of a compound of formula (II) with a compound of formula (III) takes place in solution with solvent such as DMF for example, in the presence of a base, typically potassium carbonate $K_2CO_3$, and potassium iodide KI with a catalytic amount of phenothiazine.

The polymer obtained by said process does not need any further purification step anymore and can be formulated and directly used.

The object of the present invention is therefore to provide a novel process for the synthesis of the aryl acrylic acid esters photoaligning polymer material comprising repeating structural units of formula (I), to the compounds obtained by said process, to compositions comprising such compounds, to the use of such compositions for the alignment of liquid crystals in non-structured and structured optical elements, electro-optical elements, multi-layer systems and nanoelectronics elements, and to non-structured and structured optical elements or electro-optical elements, multi-layer system and variable transmission films comprising said compositions.

The process disclosed above can be stopped at any time upon heating to degrade the organic or inorganic peroxide and thereby stopping polymerization. Heating can be performed via methods known in the art, such as oil bath, sand bath, jacketed heating system, double mantle vessel, infrared conveyor, microwaves. The polymerization process can for example be stopped when the polymers have reached the desired length or molecular weight. In addition the process can be stopped by using a radical inhibitor or a radical scavenger.

The end product does not need to be further purified. Therefore, the polymer solution may still contain unreacted monomers. It is also an object of the present invention to provide compositions comprising polymers comprising repeating structural units of formula (I) and unreacted monomers of formula (I) in a ratio 50/50, more preferably in a ratio 75/25, even more preferably in a ratio of 90/10, even more preferably >90/<10.

As the process yield only polymers comprising one type of monomers, the end product of such reaction is a homopolymer.

The term "linking group", as used in the context of the present invention is selected from —O—, —CO, —CO—O—, —O—CO—,

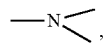

—NR$^1$—, —NR$^1$—CO—, —CO—NR$^1$—, —NR$^1$—CO—O—, —O—CO—NR$^1$—, —NR$^1$—CO—NR$^1$—, —CH═CH—, —C≡—, —O—CO—O—, and —Si(CH$_3$)$_2$—O—Si(CH$_3$)$_2$—, wherein:

R$^1$ represents a hydrogen atom or C$_1$-C$_6$alkyl;

with the proviso that oxygen atoms of linking groups are not directly linked to each other.

The term "spacer unit", as used in the context of the present invention is a cyclic, straight-chain or branched, substituted or unsubstituted C$_1$-C$_{24}$ alkylen in which one or more, preferably non-adjacent, —C—, —CH—, —CH$_2$— group may be replaced by a linking group as defined above.

In the context of the present invention the term "alkyl" is substituted or unsubstituted, straight-chain or branched, saturated hydrocarbon residues with a maximum of 20 carbon atoms, wherein one or more —CH$_2$— or —CH$_3$— groups may be unreplaced or replaced by at least one linking group as described above, or/and alicyclic or/and aromatic group.

The term "lower alkyl" and similarly "lower alkoxy", "hydroxy-lower alkyl", "phenoxy-lower alkyl", "phenyl-lower alkyl", denotes, hereinbefore and hereinafter, straight-chain or branched saturated hydrocarbon residues with 1 to 6, preferably with 1 to 3 carbon atoms, such as methyl, ethyl, propyl, or i-propyl.

The term "alkyl" and similarly "alkoxy", denotes, hereinbefore and hereinafter, straight-chain or branched saturated hydrocarbon residues with a maximum of 20 carbon atoms.

The substituents of "alkyl" or "alkoxy" are hydroxy, fluorine, chlorine, cyano, ether, ester, amino, amido, alicyclic or aromatic groups, wherein in each one or more —CH$_2$— group may be replaced by at least one linking group.

In the context of the present invention "straight chain alkyl" is without limitation for example methyl, ethyl, propyl, isopropyl, butyl, sec.-butyl, tert.-butyl, pentyl, hexyl, heptyl, octyl, nonyl, decyl, undecyl, dodecyl, tridecyl, tetradecyl, pentadecyl, hexadecyl, heptadecyl, octadecyl, nondecyl, icosyl, henicosyl, docosyl, tricosyl or quatrocosyl.

In the context of the present invention "alicyclic group" denotes for example a substituted or unsubstituted non-aromatic carbocyclic or heterocyclic group and represents for example ring systems, with 3 to 30 carbon atoms, as for example cyclopropane, cyclobutane, cyclopentane, cyclopentene, cyclohexane, cyclohexene, cyclohexadiene, decaline, adamantane, tetrahydrofuran, dioxane, dioxolane, pyrrolidine, piperidine or a steroidal skeleton such as cholesterol, wherein substituents are preferably methyl, ethyl, propyl, butyl, pentyl, hexyl, heptyl, octyl, more preferably methyl, ethyl, propyl, butyl, pentyl, hexyl, and ost preferred methyl, ethyl, propyl. Preferred alicyclic group is cyclopentane, cyclopentene, cyclohexane, cyclohexene, and more preferred are cyclopentane or cyclohexane.

In the context of the present invention "aromatic group" denotes preferably five, six, ten or 14 ring atoms, e.g. furan, benzene or phenylene, pyridine, pyrimidine, naphthalenen, which may form ring assemblies, such as biphenylene or triphenylen, which are uninterrupted or interrupted by at least a single heteroatom and/or at least a single linking group; or fused polycyclic systems, such as phenanthrene or tetraline. Preferably aromatic group are benzene, phenylene, biphenylene or triphenylen. More preferred aromatic group are benzene, phenylene and biphenylene. Most preferred is phenylene.

The term "phenylene which is unsubstituted or optionally substituted with fluorine, chlorine, cyano, alkyl or alkoxy" embraces in the scope of the present invention 1,2-, 1,3- or 1,4-phenylene, especially however 1,3- or 1,4-phenylene, which is unsubstituted or mono- or multiply-substituted with fluorine, chlorine, cyano, alkyl or alkoxy, preferably with fluorine, methyl, ethyl, propyl, butyl, methoxy, ethoxy, propoxy, butoxy or cyano. Especially preferred are 1,4-phenylene residues. Examples of preferred phenylene residues are 1,3- or, 1,4-phenylene, 4- or 5-methyl-1,3-phenylene, 4- or 5-methoxy-1,3-phenylene, 4- or 5-ethyl-1,3-phenylene, 4- or 5-ethoxy-1,3-phenylene, 2- or 3-methyl-1,4-phenylene, 2- or 3-ethyl-1,4-phenylene, 2- or 3-propyl-1,4-phenylene, 2- or 3-butyl-1,4-phenylene, 2- or 3-methoxy-1,4-phenylene, 2- or 3-ethoxy-1,4-phenylene, 2- or 3-propoxy-1,4-phenylene, 2- or 3-butoxy-1,4-phenylene, 2,3-, 2,6- or 3,5-dimethyl-1,4-phenylene, 2,6- or 3,5-dimethoxy-1,4-phenylene, 2- or 3-fluoro-1,4-phenylene, 2,3-, 2,6- or 3,5-difluoro-1,4-phenylene, 2- or 3-chloro-1,4-phenylene, 2,3-, 2,6- or 3,5-dichloro-1,4-phenylene, 2- or 3-cyano-1,4-phenylene, and the like.

In a preferred embodiment, $S^1$ is a spacer unit, wherein, if m and n are 0 then the spacer unit is $S^2$ and if at least one m or n is 1, then the spacer unit is $S^3$;

wherein $S^2$ and $S^3$ are unsubstituted or unsubstituted, straight-chain or branched, —$(CH_2)_r$—, as well as —$(CH_2)_r$—O—, —$(CH_2)_r$—O—$(CH_2)_s$—, —$(CH_2)_r$—O—$(CH_2)_s$—O—, —$(CH_2)_r$—CO—, —$(CH_2)_r$—CO—O—, —$(CH_2)_r$—O—CO—, —$(CH_2)_r$—NR$^2$—, —$(CH_2)_r$—CO—NR$^2$—, —$(CH_2)_r$—NR$^2$—CO—, —$(CH_2)_r$—NR$^2$—CO—, —$(CH_2)_r$—NR$^2$—CO—O— or —$(CH_2)_r$—NR$^2$—CO—NR$^3$—, which is optionally mono- or poly-substituted with $C_1$-$C_{24}$-alkyl, hydroxy, fluorine, chlorine, cyano, ether, ester, amino, amido;

and wherein one or more —$CH_2$— group may be replaced by a linking group, alicyclic or aromatic group;

and, in which r and s are each a whole number of 1 to 20, with the proviso that 3≤r+s≤24 for $S^2$; and that 6≤r+s≤24, for $S^3$;

and $R^2$ and $R^3$ each independently signify hydrogen or lower alkyl.

In a more preferred embodiment of the invention $S^2$ or $S^3$ is substituted or unsubstituted, straight-chain or branched, —$(CH_2)_r$—, as well as —$(CH_2)_r$—O—, —$(CH_2)_r$—O—$(CH_2)_s$—, —$(CH_2)_r$—O—$(CH_2)_s$—O—, —$(CH_2)_r$—CO—, —$(CH_2)_r$—CO—O, —$(CH_2)_r$—O—CO—, —$(CH_2)_r$—NR$^2$—, —$(CH_2)_r$—CO—NR$^2$—, —$(CH_2)_r$—NR$^2$—CO—, —$(CH_2)_r$NR$^2$—CO—O— or —$(CH_2)_r$NR$^2$—CO—NR$^3$—, wherein R2 and R3 each independently signify hydrogen or lower alkyl; preferably $S^2$ or $S^3$ is optionally mono- or multiply-substituted with $C_1$-$C_{24}$-alkyl, preferably $C_1$-$C_{12}$-alkyl, more preferably $C_1$-$C_8$-alkyl, wherein alkyl has the above given meaning and preferences; or $S^2$ or $S^3$ is optionally mono- or multiply-substituted with hydroxy, fluorine, chlorine, cyano, ether, ester, amino, amido; and wherein one or more —$CH_2$— group may be replaced by a linking group, alicyclic or/and aromatic group;

wherein for $S^2$ the single suffix "r" is a whole number between 4 and 24, preferably between 5 and 12 and more preferably between 5 and 8, especially 6 or 8; and for $S^3$ the single suffix "r" is a whole number between 8 and 24, preferably between 6 and 12 and especially 6, 7, 8, 9, 10, 11 or 12; and wherein for $S^2$ the sum of the suffixes "r and s" is a whole number between 1 and 24, preferably between 2 and 12 and more preferably between 5 and 8; and wherein for $S^3$ the sum of the suffixes "r and s" is a whole number between 6 and 24, preferably between 6 and 12 and especially 6, 7, 8, 9, 10, 11 or 12; and $R^2$ and $R^3$ each independently signify hydrogen or lower alkyl.

In a most preferred embodiment of the invention $S^2$ or $S^3$ is unsubstituted or unsubstituted, straight-chain or branched, —$(CH_2)_r$—, as well as —$(CH_2)_r$—O—, —$(CH_2)_r$—O—$(CH_2)_s$—, —$(CH_2)_r$—O—$(CH_2)_s$—O—, —$(CH_2)_r$—CO—, —$(CH_2)_r$—CO—O—, —$(CH_2)_r$—O—CO—, especially —$(CH_2)_r$—O—, —$(CH_2)_r$—O—$(CH_2)_s$—, —$(CH_2)_r$—O—$(CH_2)_s$—O—, —$(CH_2)_r$—CO—, —$(CH_2)_r$—CO—O—, —$(CH_2)_r$—O—CO—, more especially —$(CH_2)_r$—O— which is optionally mono- or multiply-substituted with $C_1$-$C_{24}$-alkyl, preferably $C_1$-$C_{12}$-alkyl, more preferably $C_1$-$C_8$-alkyl; or hydroxy, fluorine, chlorine, cyano, ether, ester, amino, amido; and wherein one or more —$CH_2$— group may be replaced by a linking group, or an alicyclic or aromatic group; and wherein the single suffixes r and s and the sum of the suffixes s and r have the above given meanings and preferences; and $R^2$ and $R^3$ each independently signify hydrogen or lower alkyl.

Preferably substituent of alkylene in $S^2$, $S^{2'}$, $S^3$, $S^{3'}$ is $C_1$-$C_{24}$-alkyl, preferably $C_1$-$C_{12}$-alkyl, more preferably $C_1$-$C_8$-alkyl, hydroxy, fluorine, chlorine, cyano, ether, ester, amino or amido.

Examples of preferred "spacer unit" $S^2$ is 1,6-hexylene, 1,7-heptylene, 2-methyl-1,2-propylene, 1,3-butylene, ethyleneoxycarbonyl, ethyleneoyloxy, propyleneoxy, propyleneoxycarbonyl, propyleneoyloxy, butyleneoxy, butyleneoxycarbonyl, butyleneoyloxy, propyleneamino, butyleneamino, pentyleneamino, hexyleneamino, heptyleneamino, ethyleneaminocarbonyl, propyleneaminocarbonyl, butyleneaminocarbonyl, ethylenecarbonylamino, propylenecarbonylamino, butylenecarbonylamino, pentylenecarbonylamino, hexylenecarbonylamino, heptylenecarbonylamino, pentyleneaminocarbonyl, hexyleneaminocarbonyl, heptyleneaminocarbonyl, pentyleneoxy, pentyleneoxycarbonyl, pentyleneoyloxy, hexyleneoxy, hexyleneoxycarbonyl, hexyleneoyloxy, heptyleneoxy, heptyleneoxycarbonyl, heptyleneoyloxy, especially preferred is hexyleneoxy.

Examples of preferred "spacer unit" $S^3$ is 1,6-hexylene, 1,7-heptylene, 1,8-octylene, 1,9-nonylene, 1,10-decylene, 1,11-undecylene, 1,12-dodecylene, 9-nonyleneoxy, 11-undecyleneoxy, 12-dodecyleneoxy, 11-undecyleneoxycarbonyl, 12-dodecyleneoxycarbonyl, 9-nonyleneoxycarbonyl, 11-undecyleneoyloxy, 12-dodecyleneoyloxy, 9-nonyleneoyloxy, 11-undecyleneamino, 12-dodecyleneamino, 9-nonyleneamino, 11-undecyleneaminocarbonyl, 12-dodecyleneaminocarbonyl, 9-nonyleneaminocarbonyl, 11-undecylenecarbonylamino, 12-dodecylene carbonylamino, nonylenecarbonylamino, and the like.

Especially preferred "spacer unit" $S^2$ is a straight-chain alkylene grouping represented by —$(CH_2)_r$—, wherein r is 6 or 8, as well as —$(CH_2)_r$—O—, —$(CH_2)_r$—CO—O— and —$(CH_2)_4$—O—CO—.

Further, especially preferred "spacer units" $S^3$ is a straight-chain alkylene grouping represented by —$(CH_2)_r$—, wherein r is 6, 7, 8, 9, 10, 11, 12, as well as —$(CH_2)_r$—O—, —$(CH_2)_r$—CO—O— and —$(CH_2)_r$—O—CO—.

In the context of the present invention the term "halogenated" means that the photoaligning polymer material comprising aryl acrylic acid ester groups contain one or more halogen atoms, preferably two halogen atoms, more preferably three halogen atoms. It is encompassed by the present invention that the halogen atoms are all bound to the same carbon atom or to different carbon atoms. It is also encompassed that the same molecule may be halogenated by different halogen atoms. Halogen atoms are fluorine, chlorine, bromine or iodine.

In the context of the present invention "siloxane moieties" means any substituent comprising at least a functional group with the Si—O—Si linkage. The photoaligning polymer materials according to the present invention may contain one or more siloxane moieties.

Further, preferred are processes for the synthesis of aryl acrylic acid esters photoaligning polymer material comprising repeating structural units of formula (I) wherein:

$M^1$ is acrylate, methacrylate and styrene derivatives ring A signifies phenylene which is unsubstituted or optionally substituted with fluorine, chlorine, cyano, alkyl or alkoxy, pyridine-2,5-diyl, pyrimidine-2,5-diyl, cyclohexane-1,4-diyl;

ring B signifies phenylene which is unsubstituted or optionally substituted with fluorine, chlorine, cyano, alkyl or alkoxy, pyridine-2,5-diyl, pyrimidine-2,5-diyl, 1,4- or 2,6-naphthylene, cyclohexane-1,4-diyl;

$Y^1$, $Y^2$ each independently signify a single covalent bond, —$CH_2CH_2$—, —O—, —$CF_2O$—, —$OCF_2$—, —$CH_2$—O—, —O—$CH_2$—, —CO—O— or —O—OC—;

ring C signifies phenylene which is unsubstituted or optionally substituted with fluorine, chlorine, cyano, alkyl or alkoxy, or pyrimidine-2,5-diyl, pyridine-2,5-diyl, 2,5-furanylene, 1,4- or 2,6-naphthylene;

Z signifies —O— and $S^1$, D, m and n have the significance given above.

More preferred are processes for the synthesis of aryl acrylic acid esters photoaligning polymer material comprising repeating structural units of formula (I) wherein:

$M^1$ is a monomer unit selected from the group consisting of acrylate, methacrylate;

ring A is unsubstituted phenylene or phenylene which is substituted with alkyl or alkoxy;

ring B is unsubstituted phenylene or phenylene which is substituted with fluorine, alkyl or alkoxy;

$Y^1$, $Y^2$ each independently is a single covalent bond, —CO—O—, —O—OC—;

ring C is unsubstituted phenylene or phenylene which is substituted with alkyl or alkoxy, preferably methoxy;

Z is —O—; and $S^1$, D, m and n have the significance given above.

The process for the preparation of aryl acrylic acid esters photoaligning polymer material comprising repeating structural units of formula (I) comprises steps a. to d. as previously described. Step a. of the process according to the present invention preferably occurs in the presence of compounds of formulae (IV) or (IV') if Y=O and m=O. In case Y=C, in step a. of the process according to the present invention, the compounds of formula (IV) or (IV') are not required.

In a preferred embodiment the compound of formula (III) is characterized by the following:

$M^1$ is a monomer unit selected from the group consisting of acrylate, methacrylate;

ring A is unsubstituted phenylene or phenylene which is substituted with alkyl or alkoxy;

ring B is unsubstituted phenylene or phenylene which is substituted with fluorine, alkyl or alkoxy;

$Y^1$, $Y^2$ each independently is a single covalent bond —CO—O—, —O—OC—;

m, n each independently is 0 or 1;

$S^1$ is as described above.

In a preferred embodiment the compound of formula (II) is characterized by the following Y is O;

ring C is unsubstituted phenylene or phenylene which is substituted with alkyl or alkoxy, preferably methoxy;

X is OH;

R and m are as described above.

In the preferred embodiment, the compounds of formulae (II) and (III) are reacted in the presence of a compound of formulae (IV) or (IV').

The reaction of a compound of formula (II) with a compound of formula (III) takes place in solution with solvent such as DMF for example, in the presence of a base, typically potassium carbonate $K_2CO_3$, and potassium iodide KI with a catalytic amount of phenothiazine.

In another preferred embodiment the compound of formula (II) is characterized by the following:

Y is CR';

ring C is unsubstituted phenylene or phenylene which is substituted with alkyl or alkoxy;

X is OH;

R and m are as described above.

In the preferred embodiment, the compounds of formulae (II) and (III) compounds of formulae (IV) or (IV') are not used.

The reaction of a compound of formula (II) with a compound of formula (III) takes place in solution with solvent such as DMF for example, in the presence of a base, typically potassium carbonate $K_2CO_3$, and potassium iodide KI with a catalytic amount of phenothiazine.

In a more preferred embodiment, the compound of formula (II) is selected from:

In a preferred embodiment, step b. of the process according to the present invention, occurs when the compound of formula (I) is terminally halogenated or substituted with siloxane moieties, i.e. if D is a $C_1$-$C_{12}$ straight-chain or branched alkylene chain which is halogenated at least once or contains one or more siloxane moieties.

The conditions of the process for the synthesis of the aryl acrylic acid esters photoaligning polymer material comprising repeating structural units of formula (I) according to the present invention are well-known to the skilled person.

In a further embodiment, the present invention also relates to compounds obtained by the process as described above and to compositions, especially a formulation or/and a blend comprising the compounds of formula (I) obtained by the process as described above as homopolymer and/or as monomer and optionally a solvent.

Preferably, the composition comprises further solvents, such as especially aprotic or protic polar solvents γ-butyrolactone, N,N-dimethylacetamide, N-methylpyrrolidone or N,N-dimethylformamide, methylethylketon (MEK), methylisobutylketon (MIBK), 3-pentanone, cyclopentanone, cyclohexanone, ethylacetate, n-butylacetate, 1-methoxypropylacetat (MPA), alcohols, isopropanol, n-butanol, butan-2-ol, especially 1-methoxypropanol (MP). Preferred are aprotic polar solvents, especially γ-butyrolactone, N,N-dimethylacetamide, N-methylpyrrolidone or N,N-dimethylformamide, methylethylketon (MEK), methylisobutylketon (MIBK), 3-pentanone, cyclopentanone, cyclohexanone, ethylacetate, n-butylacetate, 1-methoxypropylacetat (MPA).

The homopolymers of formula (I) or the compounds obtained by the process described above, have a molecular weight MW between 10,000 and 1,000,000, preferably between 20,000 and 900,000, more preferably between 50,000 and 500,000, even more preferably between 75,000 and 400,000, especially more preferably between 100,000 and 300,000.

($M^1$) are acrylates such as

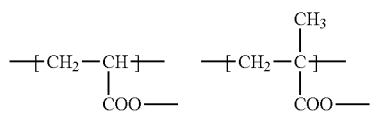

acrylamides such as

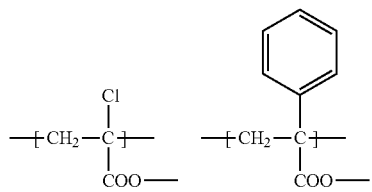

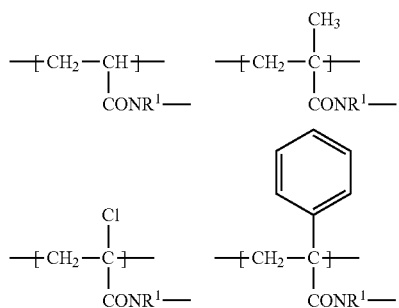

vinyl ether and vinyl ester such as

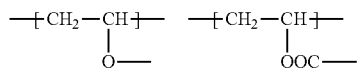

styrene derivatives such as

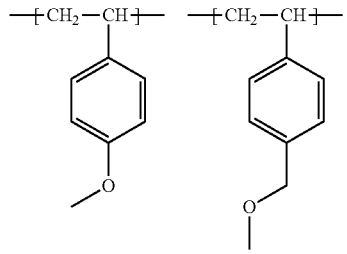

siloxanes such as

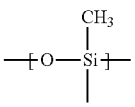

wherein $R^1$ signifies hydrogen or lower alkyl.

Preferred examples of (V) are acrylate, methacrylate, 2-chloroacrylate, acrylamide, methacrylamide, 2-chloro-acrylamide, styrene derivatives and siloxanes.

Acrylate, methacrylate, styrene derivatives and siloxanes are particularly preferred ($M^1$).

Quite especially preferred ($M^1$) are acrylate, methacrylate and styrene derivatives.

Especially preferred are homopolymer materials comprising aryl acrylic acid esters photoaligning polymer material comprising repeating structural units of formula (I) in which n=0, wherein:

$M^1$ is acrylate, methacrylate and styrene derivatives;

ring B signifies phenylene which is unsubstituted or optionally substituted with fluorine, chlorine, cyano, alkyl or alkoxy, pyridine-2,5-diyl, pyrimidine-2,5-diyl, cyclohexane-1,4-diyl;

$Y^2$ signifies a single covalent bond, —CO—O— or —O—OC—;

$S^2$ is substituted or unsubstituted, straight-chain or branched, —$(CH_2)_r$—, as well as —$(CH_2)_r$—O—, —$(CH_2)_r$—O—$(CH_2)_s$—, —$(CH_2)_r$—O—$(CH_2)_s$—O—, —$(CH_2)_r$—CO—, —$(CH_2)_r$—CO—O—, —$(CH_2)_r$—O—CO—, —$(CH_2)_r$—$NR^2$—, —$(CH_2)_r$—CO—$NR^2$—, —$(CH_2)_r NR^2$—CO—, —$(CH_2)_r$—$NR^2$—CO—O— or —$(CH_2)_r$—$NR^2$—CO—$NR^3$—, wherein the suffix "r" is a whole number between 4 and 24, preferably between 5 and 12 and more preferably between 5 and 8, especially 6; and m signifies 0 or 1;

ring C signifies phenylene which is unsubstituted or optionally substituted with fluorine, chlorine, cyano, alkyl or alkoxy, preferably methoxy or 1,4- or 2,6-naphthylene;

Z signifies —O— and

D is a $C_1$-$C_3$ straight-chain or branched alkylene chain which is optionally halogenated at least once or contains one or more siloxane moieties.

Further preferred are compositions comprising compounds of formula (I), wherein $M^1$, $S^1$ m and n are as defined above; and ring A signifies phenylene which is unsubstituted or optionally substituted with fluorine, chlorine, cyano, alkyl or alkoxy, pyridine-2,5-diyl, pyrimidine-2,5-diyl, cyclohexane-1,4-diyl;

ring B signifies phenylene which is unsubstituted or optionally substituted with fluorine, chlorine, cyano, alkyl or alkoxy, pyridine-2,5-diyl, pyrimidine-2,5-diyl, 1,4- or 2,6-naphthylene or cyclohexane-1,4-diyl;

$Y^1$, $Y^2$ each independently signify a single covalent bond, —$CH_2CH_2$—, —O—, —$CH_2$—O—, —O—$CH_2$—, —$OCF_2$—, —$CF_2O$—, CO—O— or —O—OC—;

ring C signifies phenylene which is unsubstituted or optionally substituted with fluorine, chlorine, cyano, alkyl or alkoxy, preferably methoxy, or pyrimidine-2,5-diyl, pyridine-2,5-diyl, 2,5-furanylene or 1,4- or 2,6-naphthylene;

Z signifies —O— and

D is a $C_1$-$C_3$ straight-chain or branched alkylene chain which is optionally halogenated at least once or contains one or more siloxane moieties.

In the context of the present invention, the process described above is used for the synthesis of a homopolymer material comprising aryl acrylic acid esters photoaligning polymer material comprising repeating structural units of formula (I), wherein:

$M^1$, $S^1$ and m, n are as defined as above; and ring A signifies phenylene which is unsubstituted or optionally substituted with fluorine, chlorine, cyano, alkyl or alkoxy, pyridine-2,5-diyl, pyrimidine-2,5-diyl, cyclohexane-1,4-diyl; ring B signifies phenylene which is unsubstituted or optionally substituted with fluorine, chlorine, cyano, alkyl or alkoxy, pyridine-2,5-diyl, pyrimidine-2,5-diyl, 1,4- or 2,6-naphthylene or cyclohexane-1,4-diyl;

$Y^1$, $Y^2$ each independently signify a single covalent bond, —$CH_2CH_2$—, —O—, —$CH_2$—O—, —O—$CH_2$, —CO—O—, —O—OC—, —$CF_2$—O— or —O—$F_2C$—;

ring C signifies phenylene which is unsubstituted or optionally substituted with fluorine, chlorine, cyano, alkyl or alkoxy, preferably methoxy, or pyrimidine-2,5-diyl, pyridine-2,5-diyl, 2,5-furanylene or 1,4- or 2,6-naphthylene;

Z signifies —O—, and

D is a $C_1$-$C_3$ straight-chain or branched alkylene chain which is optionally halogenated at least once or contains one or more siloxane moieties.

Especially preferred are homopolymer material comprising aryl acrylic acid esters photoaligning polymer material comprising repeating structural units of formula (I), wherein n signifies 0 and $M^1$ and $S^1$ are as defined above; and ring B signifies phenylene which is unsubstituted or optionally substituted with fluorine, chlorine, cyano, alkyl or alkoxy, pyridine-2,5-diyl, pyrimidine-2,5-diyl or cyclohexane-1,4-diyl;

$Y^2$ signifies a single covalent bond, —CO—O— or —O—OC—;

m signifies 0 or 1; n signifies 0;

ring C signifies phenylene which is unsubstituted or optionally substituted with fluorine, chlorine, cyano, alkyl or alkoxy, preferably methoxy, or 1,4- or 2,6-naphthylen;

Z signifies —O—, and

D is a $C_1$-$C_3$ straight-chain or branched alkylene chain which is optionally halogenated at least once or contains one or more siloxane moieties, D is especially fluorinated at least once, more especially D is a fluorinated $C_2$ alkylene chain, even more especially, D is a 2,2,2-trifluoro-ethyl.

For the polymerization, the repeating structural units are firstly prepared separately from the individual components as described above. The formation of the polymers is subsequently effected in a manner known per se under the influence of UV radiation or heat or preferably by the action of of radical initiators or inorganic or organic peroxides or ionic initiators. The radical initiators can be azo based, as for example azobisisobutyronitrile (AIBN), Azobismethylbutyronitrile (AMBN), 2,2'-Azobis(2-methylpropionamidine) dihydrochloride (AAPH), 1,1'-Azobis(cyanocyclohexane) (ACHN), 4,4'-Azobis(4-cyanovaleric acid) (ACVA) and similar compounds. Examples of inorganic peroxides are sodium persulfate, potassium persulfate or ammonium persulfate. Examples of organic peroxides are ter-butylperoxide, dicumylperoxide, laurylperoxide or peroxycarbonate. Examples of commercial peroxides are Luperox® LP (laurylperoxide), Luperox® DI (di-tertbutylperoxide) and Perkadox® IPP (Diisopropyl peroxydicarbonate) but not limited to. Ionic initiators are alkali-organic compounds such as phenyllithium or naphthylsodium or Lewis acids such as $BF_3$, $AlCl_3$, $SnCl_3$ or $TiCl_4$. These lists are not exhaustive and other initiators are contemplated in the context of the present invention as well. The monomers can be polymerized in solution, suspension, emulsion or by precipitation but not limited to.

Solvents that are used in the preparation of the polymers according to the invention are as defined above.

The compositions comprising the compounds of formula (I) obtained by the process according to the process invention or the compositions comprising a homopolymer comprising repeating structural units of formula (I) and at least one monomer of formula (I) can further be blended with other photoaligning or non-photoaligning polymers, copolymers, oligomers or monomers.

The compositions comprising the compounds of formula (I) obtained by the process according to the process invention or the compositions comprising a homopolymer comprising repeating structural units of formula (I) and at least one monomer of formula (I) may further contain solvents and/or additives, such as silane-containing compounds or/and epoxy-containing crosslinking agents or/and photo-active additives such photo-sensitizers or photo-radical generators, or/and cationic photo-initiators, or/and surfactants, or/and emulsifiers, or/and antioxidant, or/and leveling agent, or/and polymerizable liquid crystals, or/and curable compounds.

Suitable silane-containing additives are described in Plast. Eng. 36 (1996), (Polyimides, fundamentals and applications), Marcel Dekker, Inc.

Suitable epoxy-containing cross-linking additives include 4,4'-methylene-bis-(N,N-diglycidylaniline), trimethylolpropane triglycidyl ether, benzene-1,2,4,5-tetracarboxylic acid 1,2,4,5-N,N'-diglycidyldiimide, polyethylene glycol diglycidyl ether, N,N-diglycidylcyclohexylamine and the like.

Suitable photo-active additives include 2,2-dimethoxyphenylethanone, a mixture of diphenylmethanone and N,N-dimethylbenzenamine or ethyl 4-(dimethylamino)benzoate, xanthone, thioxanthone, Irgacure® 184, 369, 500, 651 and 907 (BASF), Michler's ketone, triaryl sulfonium salt and the like.

The curable compounds are both organic and inorganic compounds and they do not comprise any photo-alignable moiety. Curable compounds are used to planarize surfaces or carriers in order to reduce the surface inhomogeneity, to make surfaces or carriers harder, more resistant to scratches or more resistant to mechanical or to chemical abrasion. Such curable compounds include polymers, dendrimers, oligomers, prepolymers and monomers, which may be polymerized either by radiation or by heat. Examples of classes of suitable polymers are, but not limited to: polyalkylenes, such as polyethylene, polypropylene, polycycloolefine COP/COC, polybutadiene, poly(meth)acrylates, polyester, polystyrene, polyamide, polyether, polyurethane, polyimide, polyamide acid, polycarbonate, poly-vinylalcohol, poly-vinylchloride, cellulose and cellulose derivatives such as cellulose triacetate. Examples of suitable classes of monomers are: mono and multifunctional (meth)acrylates, epoxies, isocyanate, allyl derivatives and vinyl ethers.

It is encompassed by the present invention that the curable compounds may be added to the compositions comprising the compounds of formula (I) obtained by the process according to the process invention or the compositions comprising a homopolymer comprising repeating structural units of formula (I) and at least one monomer of formula (I). Also encompassed is that the curable compounds may be added as a layer below or above the orienting layer according to the present invention.

The present invention also relates to the use of the compositions comprising the compounds of formula (I) obtained by the process according to the process invention or the compositions comprising a homopolymer comprising repeating structural units of formula (I) and at least one monomer of formula (I) for preparing orienting layer for liquid crystals.

Further, the present invention relates to a method for the preparation of an orientation layer for liquid crystals comprising irradiating the compositions comprising the compounds of formula (I) obtained by the process according to the process invention or the compositions comprising a homopolymer comprising repeating structural units of formula (I) and at least one monomer of formula (I) with aligning light.

Preferably, the method comprises
applying the compositions comprising the compounds of formula (I) obtained by the process according to the process invention or the compositions comprising a homopolymer comprising repeating structural units of formula (I) and at least one monomer of formula (I) to a carrier,
and irradiating the compositions comprising the compounds of formula (I) obtained by the process according to the process invention or the compositions comprising a homopolymer comprising repeating structural units of formula (I) and at least one monomer of formula (I) with aligning light.

Especially preferred is the method, wherein two irradiation processes are conducted one with aligning light and the other with or without aligning light, such as isotropic light.

The term "carrier" as used in the context of the present invention is preferably transparent or not-transparent, birefringent or non-birefringent, preferably glass or plastic substrates, polymer films, such as polyethylenenaphtalate (PEN), polyethyleneterephthalat (PET), tri-acetyl cellulose (TAC), polypropylen, polycarbonate (PC), polymethylmethacrylate (PMMA), Cycloolefin copolymer (COP), or a silicon wafer, however not limited to them. The carrier can be rigid or flexible and of any form or any shape such as concave or convex. The carrier may have additional layers, such as organic, dielectric or metallic layers. The layers can have different functions, for example an organic layer can be coated as a primer layer which increases compatibility of the materials to be coated with the support. Metallic layers (such as Indium Tin Oxide (ITO)) may be used as electrodes, for example when used in electrooptical devices such as displays, or could have the function as a reflector. The carrier may also be an optical element or device which has certain functions, such as a substrate for an LCD, which might, for example, comprise thin film transistors, electrodes or color filters. In another example, the carrier is a device comprising an OLED layer structure. The carrier could also be a retarder film, a polarizer, such as a polarizing film or a sheet polarizer, a reflective polarizer, such as the commercially available Vikuity™ DBEF film however not limited to them.

In general, the compositions comprising the compounds of formula (I) obtained by the process according to the present invention or the compositions comprising a homopolymer comprising repeating structural units of formula (I) and at least one monomer are applied by general coating and printing methods known in the art. Coating methods are for example spin-coating, air doctor coating, blade coating, knife coating, kiss roll coating, cast coating, slot-orifice coating, calendar coating, die coating, dipping, brushing, casting with a bar, roller-coating, flow-coating, wire-coating, spray-coating, dip-coating, whirler-coating, cascade-coating, curtain-coating, air knife coating, gap coating, rotary screen, reverse roll coating, gravure coating, metering rod (Meyer bar) coating, slot die (Extrusion) coating, hot melt coating, roller coating, flexo coating, electrodepositing coating.

Printing methods are for example silk screen printing, relief printing such as flexographic printing, ink jet printing, intaglio printing such as direct gravure printing or offset gravure printing, lithographic printing such as offset printing, or stencil printing such as screen printing.

The carrier may be moving during the deposition of the photoaligning polymer material or of the compositions comprising the compounds of formula (I) obtained by the process according to the process invention or the compositions comprising a homopolymer comprising repeating structural units of formula (I) and at least one monomer of formula (I) and/or the photo-alignable material. For example, when production is done in a continuous roll-to-roll process.

In the context of the present invention, the term "aligning light" shall mean light, which can induce anisotropy in a photo-alignable material and which is at least partially linearly or elliptically polarized and/or is incident to the surface of an orienting layer from an oblique direction. Preferably, the aligning light is linearly polarized with a degree of polarization of more than 5:1. Wavelengths, intensity and energy of the aligning light are chosen depending on the photosensitivity of the photoalignable material and of the photoaligning group. Typically, the wavelengths are in the UV-A, UV-B and/or UV-C range or in the visible range. Preferably, the aligning light comprises light of wavelengths less than 450 nm. More preferred is that the aligning light comprises light of wavelengths less than 420 nm.

The UV light is preferably selected according to the absorption of the photoaligning groups, i.e. the absorption of the film should overlap with the emission spectrum of the lamp used for the LP-UV irradiation, more preferably with linearly polarized UV light. The intensity and the energy used are chosen depending on the photosensitivity of the material and on the orientation performances that are targeted. In most of the cases, very low energies (few mJ/cm2) already lead to high orientation quality.

More preferably, "aligning light" is at least partially linearly polarized, elliptically polarized, such as for example circularly polarized, or non-polarized, most preferably circularly polarized, or non-polarized light exposed obliquely, or at least partially linearly polarized light. Especially, most preferred aligning light denotes substantially polarised light, especially linearly polarised light; or aligning light denotes non-polarised light, which is applied by an oblique irradiation.

In case the aligning light is linearly polarized, the polarization plane of the aligning light shall mean the plane defined by the propagation direction and the polarization direction of the aligning light. In case the aligning light is elliptically polarized, the polarization plan shall mean the plane defined by the propagation direction of the light and by the major axis of the polarization ellipse.

More preferably, the aligning light is UV light, preferably linearly polarized UV light.

Thus, for the production of orienting layers in regions which are limited selectively by area, a compositions comprising the compounds of formula (I) obtained by the process according to the process invention or the compositions comprising a homopolymer comprising repeating structural units of formula (I) and at least one monomer of formula (I) can be applied. For example, firstly be produced and can be spun in a spin-coating apparatus on to a carrier that is optionally coated with an electrode (for example, a glass plate coated with indium-tin oxide (ITO) such that homogeneous layers of 0.05-50 µm thickness result. Subsequently, the regions to be oriented can be exposed e.g. to a mercury high-pressure lamp, a xenon lamp or a pulsed UV laser using a polarizer and optionally a mask in order to form structures. The duration of the exposure depends on the output of the individual lamps and can vary from a few minutes to several hours. The photoreaction can, however, also be effected by irradiating the homogeneous layer using filters which let through e.g. only the radiation which is suitable for the photoreaction.

A preferred method of the invention relates to processes for the preparation of an orienting layer wherein the time is a critical parameter, especially, in which the irradiation time is a critical parameter, such as especially to a roll-to-roll process.

The present invention also relates to orientation layers comprising a compositions comprising the compounds of formula (I) obtained by the process according to the process invention or the compositions comprising a homopolymer comprising repeating structural units of formula (I) and at least one monomer of formula (I).

The use of the compositions comprising the compounds of formula (I) obtained by the process according to the process invention or the compositions comprising a homopolymer comprising repeating structural units of formula (I) and at least one monomer of formula (I) as orienting layers for liquid crystals as well as their use in non-structured and structured optical, electro-optical and nano-electrical components, especially for the production of hybrid layer elements, is also objects of the present invention. Further, they can be used in variable transmission films.

The term "structured" refers to a variation in the azimuthal orientation, which is induced by locally varying the direction of the polarized aligning light.

Further, the present invention relates to optical, electro-optical or nanoelectrical elements comprising the composition according to the present invention.

Such optical, electro-optical or nanoelectrical elements are also called photo-alignable objects. Such photo-alignable objects have been described in non-published application EP16182085.7 and in published application WO2015/024810, which are incorporated herein by reference.

In addition, the present invention relates to the use of the compositions comprising the compounds of formula (I) obtained by the process according to the process invention or the compositions comprising a homopolymer comprising repeating structural units of formula (I) and at least one monomer of formula (I) as an orienting layer, for aligning organic or inorganic compounds, especially for aligning liquid crystals and liquid crystal polymers.

The present invention also relates to the use of the orienting layer according to the present invention in the manufacture of optical, electro-optical or nanoelectrial components and systems, especially multilayer systems, or devices for the preparation of a display waveguide, a security or brand protection element, a bar code, an optical grating, a filter, a retarder, such as 3D-retarder films, a compensation film, a reflectively polarizing film, an absorptive polarizing film, an anisotropically scattering film compensator and retardation film, a twisted retarder film, a cholesteric liquid crystal film, a guest-host liquid crystal film, a monomer corrugated film, a smectic liquid crystal film, a polarizer, a piezoelectric cell, a thin film exhibiting non linear optical properties, a decorative optical element, a brightness enhancement film, a component for wavelength-band-selective compensation, a component for multi-domain compensation, a component of multiview liquid crystal displays, an achromatic retarder, a polarization state correction/adjustment film, a component of optical or electro-optical sensors, a component of brightness enhancement film, a component for light-based telecommunication devices, a G/H-polarizer with an anisotropic absorber, a reflective circular polarizer, a reflective linear polarizer, a MC (monomer corrugated film), liquid crystal displays, especially twisted nematic (TN) liquid crystal displays, hybrid aligned nematic (HAN) liquid crystal displays, electrically controlled birefringence (ECB) liquid crystal displays, supertwisted nematic (STN) liquid crystal displays, optically compensated birefringence (OCB) liquid crystal displays, pi-cell liquid crystal displays, in-plane switching (IPS) liquid crystal displays, fringe field switching (FFS) liquid crystal displays, vertically aligned (VA) liquid crystal displays; all above display types are applied in either transmissive or reflective or transflective mode.

The optical, electro-optical or nanoelectrical component and systems, especially multilayer systems and devices can be patterned or unpatterned.

The term patterning preferably denotes to birefringence patterning and/or thickness patterning and/or patterning of the optical axis orientation, and/or patterning of the degree of polymerization. Birefringence denotes the difference between the extra-ordinary and the ordinary index of refraction.

Thus, the invention further relates to optical, electro-optical or nanoelectrical elements, systems and devices comprising compositions comprising the compounds of formula (I) obtained by the process according to the process invention or the compositions comprising a homopolymer comprising repeating structural units of formula (I) and at least one monomer of formula (I).

Preferred are optical, electro-optical or nanoelectrical elements, systems and devices comprising orienting layers according to the present invention and at least one orientable layer, such as a liquid crystal layer or liquid crystal polymer layer.

An optical component, system or device creates, manipulates, or measures electromagnetic radiation.

An electro-optical component, system or device operates by modification of the optical properties of a material by an electric field. Thus it concerns the interaction between the electromagnetic (optical) and the electrical (electronic) states of materials.

The orienting layer has the ability to align slave materials, such as for example liquid crystals, such as nematic liquid crystals, with their long axis along a preferred direction.

The present invention also relates to the use of the orienting layer according to the present invention, for aligning slave material. A "slave material" shall refer to any material that has the capability to establish anisotropy upon contact with a photo-aligned material. The nature of the anisotropy in the photo-aligned material and in the slave material may be different from each other. Examples of slave materials are liquid crystals. Such slave materials are applied on top of an orienting layer. The slave material may be applied by coating and/or printing with or without solvent and may be applied over the full orienting layer of only on parts of it. The slave material may be polymerized by thermal treatment or exposure to actinic light. Polymerization may be performed under inert atmosphere, such as nitrogen, or under vacuum. The slave material may further contain isotropic or anisotropic dyes and/or fluorescent dyes.

A slave material may comprise polymerizable and/or non-polymerizable compounds. Within the context of the present invention the terms "polymerizable" and "polymerized" shall include the meaning of "cross-linkable" and "cross-linked", respectively. Likewise "polymerization" shall include the meaning of "cross-linking".

Al liquid crystal polymer (LCP) material as used within the context of the present application shall mean a liquid crystal material, which comprises liquid crystal monomers and/or liquid crystal oligomers and/or liquid crystal polymers and/or cross-linked liquid crystals. In case the liquid crystal material comprises liquid crystal monomers, such monomers may be polymerized, typically after anisotropy has been created in the LCP material due to contact with a photo-aligning polymer material of a composition comprising the photo-aligning polymer material according to the present invention. Polymerization may be initiated by thermal treatment or by exposure to actinic light, which preferably comprises UV-light. A LCP-material may consist of a single type of a liquid crystal compound, but may also be a composition of different polymerizable and/or non-polymerizable compounds, wherein not all of the compounds have to be liquid crystal compounds. Further, an LCP material may contain additives, for examples, a photo-initiator or isotropic or anisotropic fluorescent and/or non-fluorescent dyes.

The term "anisotropy" or "anisotropic" refers to the property of being directionally dependent. Something that is anisotropic may appear different or have different characteristics in different directions. These terms may, for example, refer to the optical absorption, the birefringence, the electrical conductivity, the molecular orientation, the property for alignment of other materials, for example for liquid crystals, or mechanical properties, such as the elasticity modulus. In the context of this application the term "alignment direction" shall refer to the symmetry axis of the anisotropic property.

Preferred is the use for the induction of planar alignment, tilted or vertical alignment of adjacent liquid crystalline layers; more preferred is the use for the induction of planar alignment or vertical alignment in adjacent liquid crystalline layers.

It has surprisingly been found in the present invention that the process for the synthesis of aryl acrylic acid esters photoaligning polymer material comprising repeating structural units of formula (I) comprising steps a. to d. shows an economic improvement over the processes disclosed in the prior art. Furthermore said process has an improved yield. In addition the polymerization does not require the use of toxic radical initiators and the polymerization step is easily controllable and reliable. The obtained homopolymer is of high purity. The composition comprising the compounds of formula (I) obtained by the process according to the present invention or the compositions comprising a homopolymer comprising repeating structural units of formula (I) and at least one monomer of formula (I) can be easily controlled in the ratio between homopolymer and monomer amount by methods known by the skilled person. Those methods include, but are not limited to, Gel Permeation Chromatography (GPC). Said compositions have the advantage that they can be used directly as photoalignment compositions and do not need further isolation and/or purification steps.

The polymers in accordance with the invention are illustrated in more detail by the following Examples.

EXAMPLES

Example 1

Preparation of (E)-3-[4-[6-(2-methylprop-2-enoyloxy)hexoxy]phenyl]prop-2-enoic acid

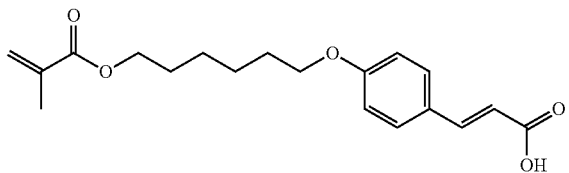 [SMILES: C=C(C)C(=O)OCCCCCCOc1ccc(/C=C/C(=O)O)cc1]

100.0 g of 4-hydroxybenzaldehyde, 147.0 g of potassium carbonate (powder), 12.0 g of potassium iodide and 0.1 g of phenothiazine are suspended in 500.0 g of DMF. To this suspension is added 176.0 g of 6-chlorohexyl 2-methylprop-2-enoate. The resulting mixture is then heated up to 90° C. under Nitrogen atmosphere. After 6 hours at 90° C. the reaction mixture is cooled down to 20° C. and filtered on Hyflo. The remaining solid is washed with 100 g of DMF. The resulting DMF solution is transferred in a reactor. To this solution 14.3 g of morpholine and 0.1 g of phenothiazine are added. The reaction mixture is then heated up to 85° C. and a solution of 170.7 g of malonic acid in 270 g of DMF is added dropwise over a period of 4 hours. After 4 more hours of stirring at this temperature the reaction mixture is cooled to 60° C. and 300 mL of water are added dropwise. After cooling down the mixture to 15° C. the solid is filtered off to obtain 218 g of Compound 1 as a yellowish solid with an HPLC purity of >95%.

1H NMR (300 MHz) in DMSO-d6 of compound 1: 12.05; (s, 1H), 7.61; (d, 2H), 7.49; (d, 1H), 6.94; (d, 2H), 6.35; (d, 1H), 6.01; (t, 1H), 5.65; (t, 1H), 4.09; (t, 2H), 4.00; (t, 2H), 1.87; (m, 3H), 1.72; (m, 2H), 1.63; (m, 2H), 1.41; (m, 4H).

Example 2

Preparation of 6-[4-[(E)-3-oxo-3-(2,2,2-trifluoroethoxy)prop-1-enyl]phenoxy]hexyl 2-methylprop-2-enoate

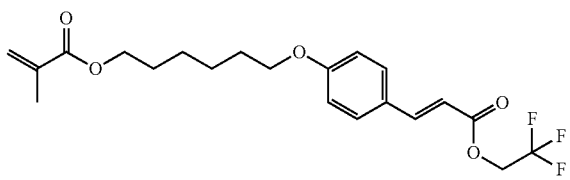 [SMILES: C=C(C)C(=O)OCCCCCCOc1ccc(/C=C/C(=O)OCC(F)(F)F)cc1]

To 28 g of Compound 1 obtained according to Example 1 in 150 ml of acetone are added 0.05 g of BHT, 0.05 g of phenothiazine and 16.4 g of 1,1'-carbonyldiimidazole (CDI). The reaction mixture is stirred for 1 hour at room temperature (RT). Then, 12.7 g of 2,2,2-trifluoroethanol, 1.0 g of DMAP and 13.0 g of trimethylamine are added to the solution and stirred for 3 more hours at RT. The reaction mixture is then filtered over Hyflo, the remaining solid is washed with 50 g of acetone. The filtered solution is cooled down to 10° C. and 250 g of water are then added dropwise for 1 hour, forming a precipitate which is stirred in solution for another 1 hour. After filtration and washing 25 g of Compound 2 is obtained as a white solid with an HPLC purity of >97%.

1H NMR (300 MHz) in CDCl3 of compound 2: 7.75; (d, 1H), 7.51; (d, 2H), 6.91; (d, 2H), 6.35; (d, 1H), 6.11; (m, 1H), 5.56; (m, 1H), 4.60; (dd, 2H), 4.18; (t, 2H), 4.02; (t, 2H), 1.96; (m, 3H), 1.84; (m, 2H), 1.74; (m, 2H), 1.51; (m, 4H).

Alternative Synthesis of Compound 2

400.1 g of 4-hydroxybenzaldehyde, 588.4 g of potassium carbonate (powder), 40.0 g of potassium iodide and 0.4 g of phenothiazine are suspended in 1600 g of DMF. To this suspension is added 710.7 g of 6-chlorohexyl 2-methylprop-2-enoate. The resulting mixture is then heated up to 85° C. under Nitrogen atmosphere. After 18 hours at 85° C. the reaction mixture is cooled down to 20° C. and filtered over Hyflo. The remaining solid is washed with 400 g of DMF. The resulting DMF solution is transferred in a reactor.

To this solution 0.6 g of phenothiazine, 0.6 g pf BHT, 727.98 g of propanedioic acid, 1-(2,2,2-trifluoroethyl) ester (obtained from the condensation of 2,2,2-trifluoroethanol and Meldrum's acid) in 250 g of DMF and 114 g of morpholine are added. The reaction mixture is then stirred under nitrogen at 50° C. After 6 hours the reaction is cooled down to RT, and then isopropanol was added. Water is then added dropwise to precipitate the product out of the orange solution. After filtration and washing 1080 g of Compound 2 is obtained as a white solid with an HPLC purity of >97%.

Example 3

Preparation of 6-[2-methoxy-4-[(E)-3-oxo-3-(2,2,2-trifluoroethoxy)prop-1-enyl]phenoxy]hexyl 2-methylprop-2-enoate

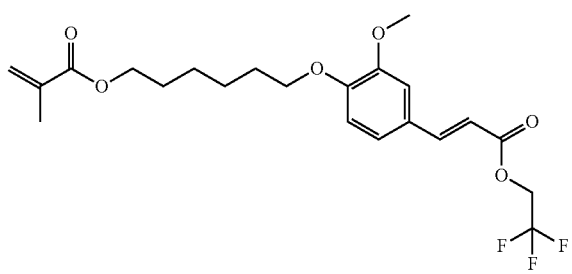 [SMILES: C=C(C)C(=O)OCCCCCCOc1ccc(/C=C/C(=O)OCC(F)(F)F)cc1OC]

Following the alternative synthesis method described above, the condensation of 6-chlorohexyl 2-methylprop-2-enoate with Vanillin, followed by the condensation with propanedioic acid, 1-(2,2,2-trifluoroethyl) ester lead to Compound 3 in 78% yield with an HPLC purity of >97%.

1H NMR (300 MHz) in DMSO-d6 of Compound 3: 7.70; (d, 1H), 7.42; (d, 1H), 7.26; (d, 1H), 6.98; (d, 1H), 6.68; (d, 1H), 6.02; (m, 1H), 5.66; (m, 1H), 4.85; (dd, 2H), 4.10; (t, 2H), 4.03; (t, 2H), 3.81; (s, 3H), 1.88; (m, 3H), 1.72; (m, 2H), 1.64; (m, 2H), 1.43; (m, 4H).

Example 4

Preparation of 8-[2-methoxy-4-[(E)-3-oxo-3-(2,2,2-trifluoroethoxy)prop-1-enyl]phenoxy]octyl 2-methylprop-2-enoate

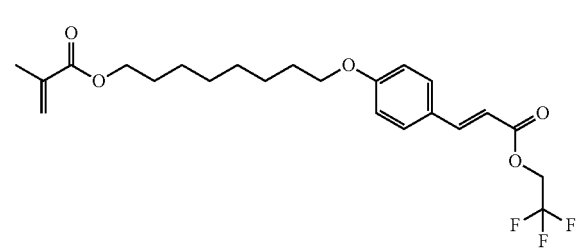 [SMILES: C=C(C)C(=O)OCCCCCCCCOc1ccc(/C=C/C(=O)OCC(F)(F)F)cc1]

As described for Compound 3, the condensation of 8-chlorooctyl 2-methylprop-2-enoate with 4-hydroxybenzaldehyde, followed by the condensation with propanedioic acid, 1-(2,2,2-trifluoroethyl) ester lead to Compound 4 in 70% yield with an HPLC purity of >97%.

1H NMR (300 MHz) in CDCl3 of Compound 4: 7.73; (d, 1H), 7.47; (d, 2H), 6.91; (d, 2H), 6.35; (d, 1H), 6.09; (m, 1H), 5.56; (m, 1H), 4.57; (dd, 2H), 4.14; (t, 2H), 3.98; (t, 2H), 1.94; (m, 3H), 1.77; (m, 2H), 1.68; (m, 2H), 1.45; (m, 8H).

Example 5

Preparation of 8-[2-methoxy-4-[(E)-3-oxo-3-(2,2,2-trifluoroethoxy)prop-1-enyl]phenoxy]octyl 2-methylprop-2-enoate

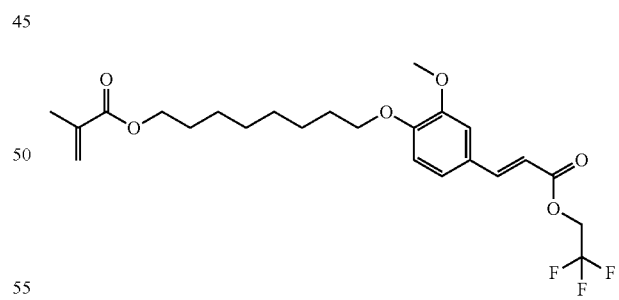

As described for Compound 3, the condensation of 8-chlorooctyl 2-methylprop-2-enoate with Vanillin, followed by the condensation with propanedioic acid, 1-(2,2,2-trifluoroethyl) ester lead to Compound 5 in 60% yield with an HPLC purity of >95%.

1H NMR (300 MHz) in DMSO-d6 of Compound 5: 7.70; (d, 1H), 7.42; (d, 1H), 7.30; (d, 1H), 7.00; (d, 1H), 6.70; (d, 1H), 6.01; (m, 1H), 5.66; (m, 1H), 4.85; (dd, 2H), 4.10; (t, 2H), 3.99; (t, 2H), 3.80; (s, 3H), 1.87; (m, 3H), 1.72; (m, 2H), 1.61; (m, 2H), 1.33; (m, 8H).

Example 6

Preparation of [2-methoxy-4-[(E)-3-oxo-3-(2,2,2-trifluoroethoxy)prop-1-enyl]phenyl]4-(6-prop-2-enoyloxyhexoxy)benzoate

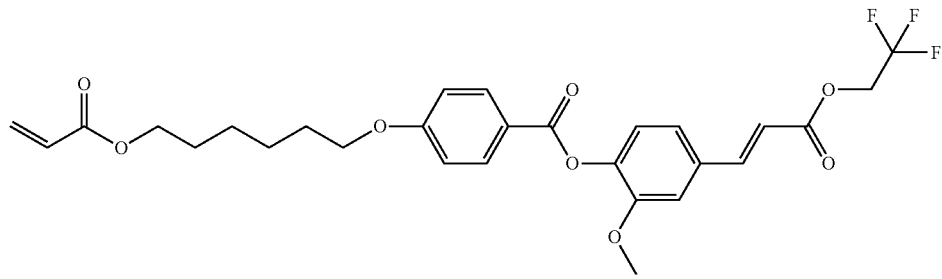 [SMILES: C=CC(=O)OCCCCCCOc1ccc(C(=O)Oc2ccc(/C=C/C(=O)OCC(F)(F)F)cc2OC)cc1]

As described for Compound 3, the condensation of 8-chlorooctyl 2-methylprop-2-enoate with (4-formyl-2-methoxy-phenyl) 4-hydroxybenzoate, followed by the condensation with propanedioic acid, 1-(2,2,2-trifluoroethyl) ester lead to Compound 6 in 76% yield with an HPLC purity of >93%.

1H NMR (300 MHz) in DMSO-d6 of Compound 6: 8.06; (d, 2H), 7.83; (d, 1H), 7.78; (s, 1H), 7.40; (d, 1H), 7.30; (d, 1H), 7.11; (d, 2H), 6.90; (d, 1H), 6.30 (d, 1H), 6.20 (dd, 1H), 5.95; (d, 1H), 4.90; (dd, 2H), 4.10; (m, 4H), 3.83; (s, 3H), 1.77; (m, 2H), 1.65; (m, 2H), 1.44; (m, 4H).

Example 7

Preparation of 6-[4-[(E)-3-oxo-3-(4,4,4-trifluorobutoxy)prop-1-enyl]phenoxy]hexyl 2-methylprop-2-enoate

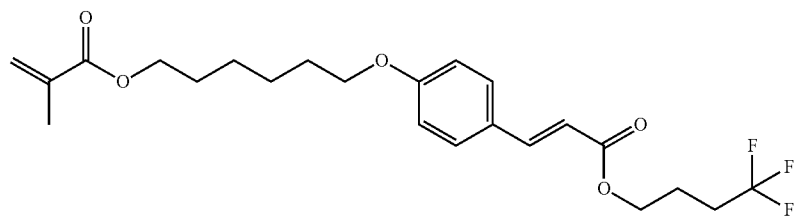 [SMILES: C=C(C)C(=O)OCCCCCCOc1ccc(/C=C/C(=O)OCCCC(F)(F)F)cc1]

The Compound 7 is obtained by reacting compound 1 with 1,1,1-trifluoro-4-iodo-butane using the same protocol as described in Example 2. Compound 7 is obtained quantitatively as a white solid with an HPLC purity >97%.

Example 8

Preparation of 6-[4-[(E)-3-methoxy-3-oxo-prop-1-enyl]phenoxy]hexyl 2-methylprop-2-enoate

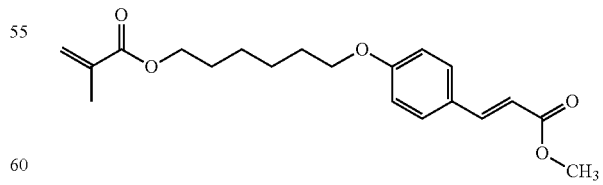

The Compound 8 is obtained by similar method as described for Example 1 by reatcing methyl (E)-3-(4-hydroxyphenyl)prop-2-enoate with 6-chlorohexyl 2-methylprop-2-enoate. Compound 8 is obtained quantitatively as a white solid with an HPLC purity >97%.

Examples 9-15

Polymerization Process 25 g of monomeric compound as synthesized in Example 2 to 8 are mixed together with 94 g of cyclohexanone (CHN) and stirred under Nitrogen until complete dissolution. The reaction mixture is then heated up to 75° C. and then 0.4 g of Luperox® LP (Lauryl peroxide) are added in one portion. The reaction mixture is then maintained at 75° C. for 5 hours then the temperature is increased to 100° C. After 1 hour at 100° C. the reaction mixture is cooled down to RT and then filtered to obtain quantitatively the polymer in CHN solution. The resulting polymer solution obtained is called Photoalignment Composition.

Example 9

Preparation of Poly-6-[4-[(E)-3-oxo-3-(2,2,2-trifluoroethoxy)prop-1-enyl]phenoxy]hexyl 2,2-dimethylbutanoate Polymer 1

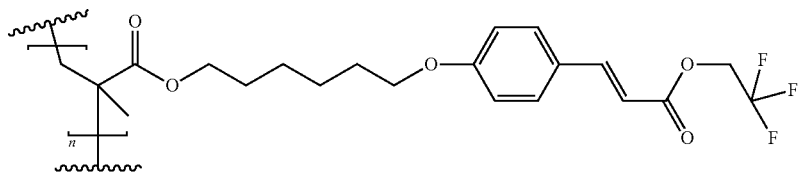

Following the polymerization process described above the Photoalignment Composition 1 is obtained, containing the polymer 1 (Mw=151000 and Mn=41800) and its monomeric compound 2 in a ratio 90.6%:9.4% (measured by GPC).

Example 10

Preparation of Poly-6-[4-[(E)-3-oxo-3-(4,4,4-trifluorobutoxy)prop-1-enyl]phenoxy]hexyl 2,2-dimethylbutanoate Polymer 2

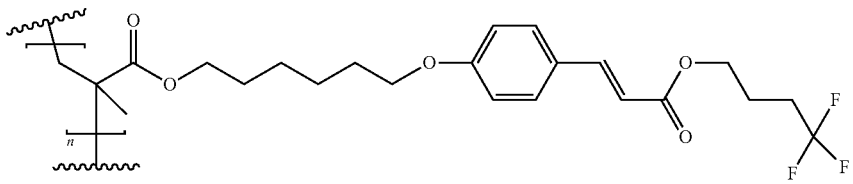

Following the polymerization process described above the Photoalignment Composition 2 is obtained, containing the polymer 2 (Mw=138000 and Mn=44600) and its monomeric compound 7 in a ratio 90.5%:9.5% (measured by GPC).

Example 11

Preparation of Poly-6-[4-[(E)-3-methoxy-3-oxoprop-1-enyl]phenoxy]hexyl 2-methylprop-2-enoate Polymer 3

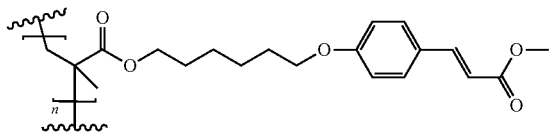

Following the polymerization process described above the Photoalignment Composition 3 is obtained, containing the polymer 3 (Mw=176700 and Mn=39900) and its monomeric compound 8 in a ratio 91.8%:8.2% (measured by GPC).

Example 12

Preparation of Poly-6-[2-methoxy-4-[(E)-3-oxo-3-(2,2,2-trifluoroethoxy)prop-1-enyl]phenoxy]hexyl 2-methylprop-2-enoate Polymer 4

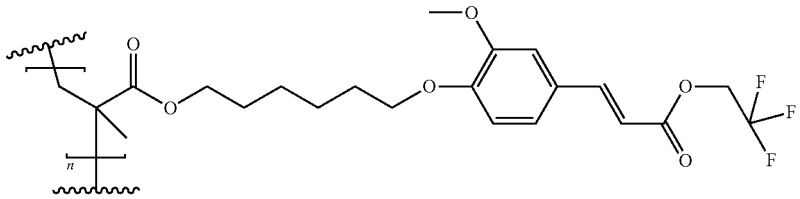

Following the polymerization process described above the Photoalignment Composition 4 is obtained, containing the polymer 4 (Mw=160700 and Mn=59500) and its monomeric compound 3 in a ratio 90.7%:9.3% (measured by GPC).

Example 13

Preparation of Poly-8-[2-methoxy-4-[(E)-3-oxo-3-(2,2,2-trifluoroethoxy)prop-1-enyl]phenoxy]octyl 2-methylprop-2-enoate Polymer 5

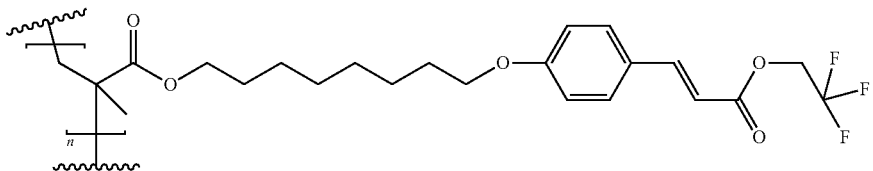

Following the polymerization process described above the Photoalignment Composition 5 is obtained, containing the polymer 5 (Mw=131600 and Mn=53200) and its monomeric compound 4 in a ratio 89.4%:10.6% (measured by GPC).

Example 14

Preparation of Poly-8-[2-methoxy-4-[(E)-3-oxo-3-(2,2,2-trifluoroethoxy)prop-1-enyl]phenoxy]octyl 2-methylprop-2-enoate Polymer 6

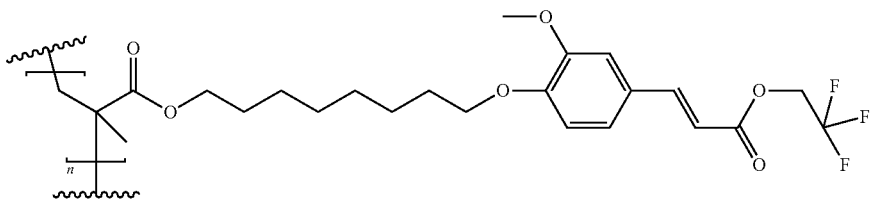

Following the polymerization process described above the Photoalignment Composition 6 is obtained, containing the polymer 6 (Mw=212100 and Mn=66100) and its monomeric compound 5 in a ratio 92.3%:7.7% (measured by GPC).

Example 15

Preparation of Poly-[2-methoxy-4-[(E)-3-oxo-3-(2,2,2-trifluoroethoxy)prop-1-enyl]phenyl]4-(6-prop-2-enoyloxyhexoxy)benzoate Polymer 7

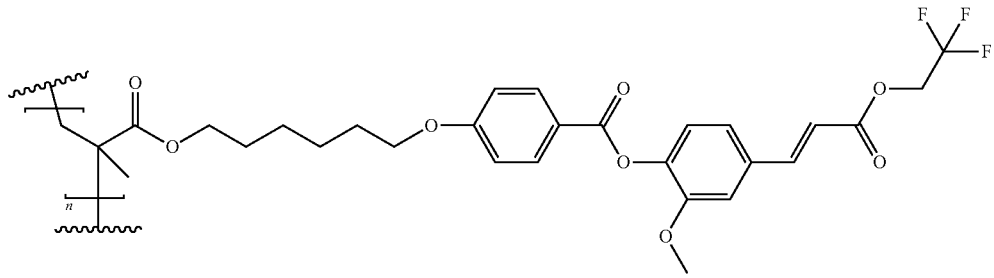

Following the polymerization process described above the Photoalignment Composition 7 is obtained, containing the polymer 7 (Mw=228000 and Mn=32900) and its monomeric compound 6 in a ratio 99.1%:0.9% (measured by GPC).

Examples 16-22

Preparation of Photoalignment Solutions

Example 16

Preparation of PAS1

The solution PAS1 is prepared by adding 15 wt % of the Photoalignment Composition 1 in 85 wt % of methoxypropylacetate and stirring the mixture for 30 minutes at room temperature.

Example 17

Preparation of PAS2

The solution PAS2 is prepared by adding 15 wt % of the Photoalignment Composition 2 in 85 wt % of methoxypropylacetate and stirring the mixture for 30 minutes at room temperature.

Example 18

Preparation of PAS3

The solution PAS3 is prepared by adding 15 wt % of the Photoalignment Composition 3 in 85 wt % of methoxypropylacetate and stirring the mixture for 30 minutes at room temperature.

Example 19

Preparation of PAS4

The solution PAS4 is prepared by adding 15 wt % of the Photoalignment Composition 4 in 85 wt % of methoxypropylacetate and stirring the mixture for 30 minutes at room temperature.

Example 20

Preparation of PAS6

The solution PAS4 is prepared by adding 15 wt % of the Photoalignment Composition 5 in 85 wt % of methoxypropylacetate and stirring the mixture for 30 minutes at room temperature.

Example 21

Preparation of PAS6

The solution PAS6 is prepared by adding 15 wt % of the Photoalignment Composition 6 in 85 wt % of methoxypropylacetate and stirring the mixture for 30 minutes at room temperature.

Example 22

Preparation of PAS7

The solution PAS7 is prepared by adding 15 wt % of the Photoalignment Composition 7 in 85 wt % of methoxypropylacetate and stirring the mixture for 30 minutes at room temperature.

APPLICATION EXAMPLES

Example 23: Preparation of a Primer Coated Substrate

A triacetate cellulose (TAC) foil was coated by means of Kbar coater (bar size 1) with a primer solution (DYMAX OC-4021 20 w % solid content in 80% Butyl acetate). The wet film was dried at 80° C. for 30 s; the thickness of the resulting dry film was about 2 μm. Then the dry film was exposed to UV light (1500 mJ, under nitrogen atmosphere).

Example 24: Preparation of an Orientation Layer using Photoalignment Solutions (PAS)

A primer coated TAC substrate of example 23 was Kbar coated (bar size 0) with a Photoalignment Solution (PAS). The wet film was dried at 80° C. for 30 s; the dry film thickness was about 100 nm. Then the dry film was exposed to aligning light, which was collimated and linearly polarized UV (LPUV) light (280-320 nm) with various exposure energy from 10 to 100 mJ/cm2. The plane of polarization was 0° with regard to a reference edge on the TAC substrate.

Example 25: Preparation of an LCP Layer Aligned by the Orientation Layer

A solution S-LCC1 is prepared by dissolving 35 wt % of

| | |
|---|---|
| 98.525% | LCC1 |
| 1.00% | Irgacure 907 (BASF) |
| 0.20% | Tinuvin 123 (BASF) |
| 0.25 | Tegoflow 300 (Evonik) |
| 0.025% | BHT (Sigma Aldrich) | in 65 wt % of a solvent mixture of 80% n-butylacetate and 20% Cyclohexanone and stirring the mixture for 30 minutes at room temperature.

LCC1 has the Following Structure pentyl 2,5-bis[[4-(6-prop-2-enoyloxyhexoxy)benzoyl]oxy]benzoate

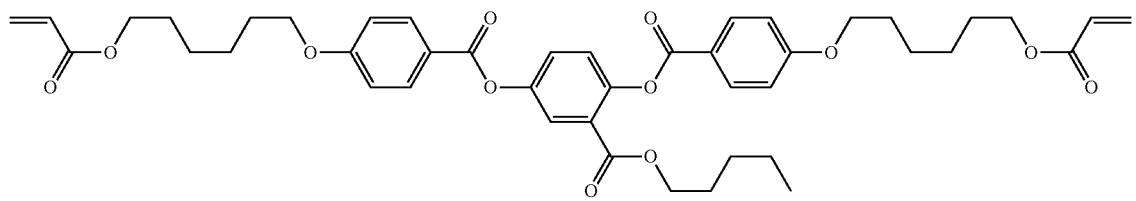 [SMILES: C=CC(=O)OCCCCCCOc1ccc(C(=O)Oc2ccc(OC(=O)c3ccc(OCCCCCCOC(=O)C=C)cc3)c(C(=O)OCCCCC)c2)cc1]

An LCP layer is prepared on top of the orientation layer of example 24 by Kbar coating (bar size 1) the LCP solution S-LCC1. The wet layer was dried at 50° C. for 60 s and subsequently the liquid crystals are cross-linked at room temperature under nitrogen atmosphere by UV-A light exposure of 30 mW/cm2 for 50 seconds.

Evaluation of Orientation

For an efficient manufacturing process it is of interest to know how much exposure energy does a photo-alignment layer require to achieve a good visible and homogeneous (without any visible defect) contrast in a LCP layer aligned by the orientation layer. The films produced have been analysed between crossed polarizers.

Alignment quality has been ranked as the following:
▲▲ very good alignment homogeneous orientation
▲ good orientation (disclination lines (DL's) area <1% of coating area)
○ few DL's (1≪5% of coating area)
x DL's visible (>5% of coating area)
xx inhomogeneous orientation or no orientation Results Optical devices have been produced by the following sequence, a primer coated substrate (as produced in Example 23) has been coated by an orientation layer using PAM materials (as described in Example 24) and aligning an LCP layer (as shown in Example 25). Various exposure energies have been used to orient the PAM materials. Summary of the results are shown in the Table below:

TABLE 1

| | LPUV dosage (mJ/cm²) | | | | | | | | | | | | |
|---|---|---|---|---|---|---|---|---|---|---|---|---|---|
| | 10 | 20 | 30 | 40 | 50 | 60 | 70 | 80 | 90 | 100 | 150 | 200 | 250 |
| PAS1 | XX | XX | X | ▲▲ | ▲▲ | ▲▲ | ▲▲ | ▲▲ | ▲▲ | ▲▲ | ▲▲ | ▲▲ | ▲▲ |
| PAS2 | XX | XX | XX | XX | XX | XX | XX | X | X | X | | | |
| PAS3 | XX | ▲▲ | ▲▲ | ▲▲ | ▲▲ | ▲▲ | ▲▲ | ▲▲ | ▲▲ | ▲▲ | ▲▲ | ▲▲ | ▲▲ |
| PAS4 | XX | X | X | ▲▲ | ▲▲ | ▲▲ | ▲▲ | ▲▲ | ▲▲ | ▲▲ | ▲▲ | ▲▲ | ▲▲ |
| PAS5 | XX | X | ▲▲ | ▲▲ | ▲▲ | ▲▲ | ▲▲ | ▲▲ | ▲▲ | ▲▲ | ▲▲ | ▲▲ | ▲▲ |

TABLE 1-continued

| | \multicolumn{13}{c}{LPUV dosage (mJ/cm$^2$)} |
| | 10 | 20 | 30 | 40 | 50 | 60 | 70 | 80 | 90 | 100 | 150 | 200 | 250 |
|---|---|---|---|---|---|---|---|---|---|---|---|---|---|
| PAS6 | XX | XX | XX | X | X | ▲▲ | ▲▲ | ▲▲ | ▲▲ | ▲▲ | ▲▲ | ▲▲ | ▲▲ |
| PAS7 | XX | XX | X | X | ▲▲ | ▲▲ | ▲▲ | ▲▲ | ▲▲ | ▲▲ | ▲▲ | ▲▲ | ▲▲ |

What is claimed is:

1. Polymer comprising repeating structural units of formula (I)

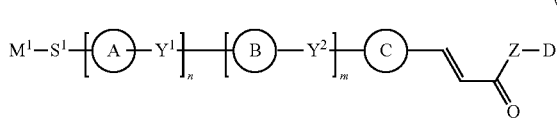

wherein:
 $M^1$ is acrylate, methacrylate or styrene
 ring A signifies phenylene which is unsubstituted or optionally substituted with fluorine, chlorine, cyano, alkyl, alkoxy, pyridine-2,5-diyl, pyrimidine-2,5-diyl, or cyclohexane-1,4-diyl;
 ring B signifies phenylene which is unsubstituted or optionally substituted with fluorine, chlorine, cyano, alkyl, alkoxy, pyridine-2,5-diyl, pyrimidine-2,5-diyl, 1,4- or 2,6-naphthylene, or cyclohexane-1,4-diyl;
 $Y^1$, $Y^2$ each independently signify a single covalent bond, —CH2CH2—, —O—, —CF$_2$O—, —OCF$_2$—, —CH2—O—, —O—CH2—, —CO—O— or —O—OC—;
 ring C signifies phenylene which is unsubstituted or optionally substituted with fluorine, chlorine, cyano, alkyl, alkoxy, pyrimidine-2,5-diyl, pyridine-2,5-diyl, 2,5-furanylene, or 1,4- or 2,6-naphthylene;
 Z signifies —O— and
 $S^1$ is a spacer unit; and
 D is a $C_1$-$C_3$ straight-chain or branched alkylene chain which contains one or more siloxane moieties, and
 m and n signify a whole number of 0 to 4.

2. A composition which comprises:
 a polymer comprising repeating structural units of formula (I)

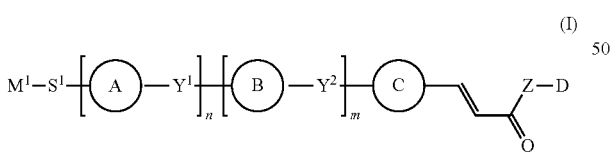

and at least one monomer of formula (I);
wherein:
 $M^1$, $S^1$, ring A, $Y^1$, ring B, $Y^2$, n, m and ring C have the same meaning as described in claim 1; and
 Z signifies —O— or —NR$^5$—,
  in which R$^5$ signifies hydrogen or lower alkyl, or a second group of formula D; and
 D is a $C_1$-$C_3$ straight-chain or branched alkylene chain which contains one or more siloxane moieties,
 wherein the molar ratio measured by GPC of the polymer to the at least one monomer is ≥90/≤10, provided that the molar ratio is not 100/0.

3. A method of orienting liquid crystals comprising orienting liquid crystals with an orientation layer comprising the composition according to claim 2.

4. A method for the preparation of an orientation layer for liquid crystals comprising irradiating the composition according to claim 2 with aligning light.

5. The composition according to claim 2, wherein the molar ratio measured by GPC of the polymer to the at least one monomer is >90/<10, provided that the molar ratio is not 100/0.

6. The composition according to claim 2, wherein the molar ratio measured by GPC of the polymer to the at least one monomer is >90/<10 and ≤99.1/≥0.9.

7. The composition according to claim 2, wherein the molar ratio measured by GPC of the polymer to the at least one monomer is ≥90/≤10 and ≤99.1/≥0.9.

8. The composition according to claim 2, wherein the molar ratio measured by GPC of the polymer to the at least one monomer is ≥90/≤10 and ≤92.3/≥7.7.

9. The composition according to claim 2, wherein the molar ratio measured by GPC of the polymer to the at least one monomer is >90/<10 and ≤92.3/≥7.7.

10. A composition which comprises:
 a polymer comprising repeating structural units of formula (I)

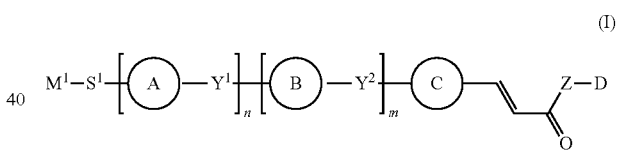

and at least one monomer of formula (I);
wherein:
 $M^1$, $S^1$, ring A, $Y^1$, ring B, $Y^2$, n, m and ring C have the same meaning as described in claim 1; and
 Z signifies —O— or —NR$^5$—,
  in which R$^5$ signifies hydrogen or lower alkyl, or a second group of formula D; and
 D is methyl or is a $C_1$-$C_3$ straight-chain or branched alkylene chain which (i) is halogenated at least once or (ii) contains one or more siloxane moieties,
 wherein the molar ratio measured by GPC of the polymer to the at least one monomer is ≥90/≤10 and ≤92.3/≥7.7.

11. The composition according to claim 2, wherein the molar ratio measured by GPC of the polymer to the at least one monomer is ≥90.5/39.5 and ≤92.3/≥7.7.

12. The composition according to claim 2, wherein the molar ratio measured by GPC of the polymer to the at least one monomer is >90/<10 and ≤91.8/≥8.2.

13. The composition according to claim 2, wherein the molar ratio measured by GPC of the polymer to the at least one monomer is ≥90/≤10 and ≤91.8/≥8.2.

14. The composition according to claim 2, wherein the molar ratio measured by GPC of the polymer to the at least one monomer is ≥90.5/≤9.5 and ≤91.8/≥8.2.

15. The composition according to claim 2, wherein the molar ratio measured by GPC of the polymer to the at least one monomer is ≥90.6/≤9.4 and ≤92.3/≥7.7.

16. The composition according to claim 2, wherein the molar ratio measured by GPC of the polymer to the at least one monomer is ≥90.6/≤9.4 and ≤91.8/≥8.2.

* * * * *